United States Patent
Schönfeld et al.

(10) Patent No.: US 10,530,093 B2
(45) Date of Patent: Jan. 7, 2020

(54) CABLE STRAIN RELIEF AND SHIELD FASTENING IN A PLUG CONNECTOR HOUSING

(71) Applicant: HARTING Electric GmbH & Co. KG, Espelkamp (DE)

(72) Inventors: Alexander Schönfeld, Osnabrück (DE); Romano Deimel, Diepenau (DE)

(73) Assignee: HARTING Electric GmbH & Co. KG, Espelkamp (DE)

( * ) Notice: Subject to any disclaimer, the term of this patent is extended or adjusted under 35 U.S.C. 154(b) by 0 days.

(21) Appl. No.: 16/266,161

(22) Filed: Feb. 4, 2019

(65) Prior Publication Data

US 2019/0245299 A1    Aug. 8, 2019

(30) Foreign Application Priority Data

Feb. 5, 2018    (DE) .................. 10 2018 102 464

(51) Int. Cl.
| | |
|---|---|
| *H01R 13/58* | (2006.01) |
| *H01R 9/05* | (2006.01) |
| *H02G 15/007* | (2006.01) |
| *H02G 3/32* | (2006.01) |
| *H01R 13/6591* | (2011.01) |

(52) U.S. Cl.
CPC ......... *H01R 13/582* (2013.01); *H01R 9/0524* (2013.01); *H01R 13/5804* (2013.01); *H01R 13/6591* (2013.01); *H02G 3/32* (2013.01); *H02G 15/007* (2013.01); *H01R 9/0515* (2013.01)

(58) Field of Classification Search
USPC .................. 439/460, 98, 100; 174/99 R
See application file for complete search history.

(56) References Cited

U.S. PATENT DOCUMENTS

| | | | | |
|---|---|---|---|---|
| 3,213,406 A | | 10/1965 | Alex et al. | |
| 3,363,864 A | * | 1/1968 | Olgreen | F16L 3/04 248/68.1 |
| 5,085,384 A | * | 2/1992 | Kasubke | F16L 3/01 248/62 |
| 5,118,306 A | * | 6/1992 | Bixler | H01R 12/675 439/358 |
| 5,203,717 A | * | 4/1993 | Beck | H01R 13/5812 439/427 |
| 5,224,674 A | * | 7/1993 | Simons | F16L 3/2235 248/68.1 |
| 5,683,272 A | * | 11/1997 | Abe | H01R 13/432 439/456 |

(Continued)

FOREIGN PATENT DOCUMENTS

| | | |
|---|---|---|
| DE | 1465997 A1 | 5/1969 |
| DE | 9203471 U1 | 6/1992 |

(Continued)

*Primary Examiner* — Harshad C Patel
(74) *Attorney, Agent, or Firm* — Smartpat PLC

(57) ABSTRACT

A plug connector housing has a cable connection element on which at least two cables, at least one first cable and at least one second cable can be fastened for shield connection and/or strain relief, wherein the cable connection element has different fastening planes for the at least first cable and the at least second cable. A plug connector with such a plug connector housing can thus be assembled in cleanroom environments.

10 Claims, 2 Drawing Sheets

(56) References Cited

U.S. PATENT DOCUMENTS

| | | | |
|---|---|---|---|
| 6,004,162 A | 12/1999 | Harting et al. | |
| 6,274,817 B1 * | 8/2001 | Jaakkola | H01R 25/14 174/68.1 |
| 7,059,892 B1 * | 6/2006 | Trout | H01R 13/5812 439/460 |
| 7,077,688 B2 | 7/2006 | Peng | |
| 7,147,512 B2 * | 12/2006 | Wu | H01R 12/721 439/607.05 |
| 7,817,144 B2 * | 10/2010 | Ozaki | G06F 3/0414 345/156 |
| 2005/0106948 A1 | 5/2005 | Peng | |
| 2010/0258685 A1 * | 10/2010 | Gardner | F16L 3/13 248/68.1 |
| 2012/0006947 A1 * | 1/2012 | Gundel | F16L 3/223 248/68.1 |
| 2018/0019548 A1 * | 1/2018 | Maesoba | H01R 13/6473 |
| 2018/0123281 A1 | 5/2018 | Griepenstroh et al. | |
| 2018/0226778 A1 | 8/2018 | Nikola | |

FOREIGN PATENT DOCUMENTS

| | | |
|---|---|---|
| DE | 202015101480 U1 | 6/2016 |
| DE | 102015106963 A1 | 11/2016 |
| DE | 102016004976 A1 | 2/2017 |
| EP | 0860906 B1 | 5/2004 |
| FR | 2986665 A1 | 8/2013 |
| JP | S49141992 U | 12/1974 |
| WO | 9906136 A1 | 2/1999 |
| WO | 2017174069 A1 | 10/2017 |

* cited by examiner

CABLE STRAIN RELIEF AND SHIELD FASTENING IN A PLUG CONNECTOR HOUSING

TECHNICAL FIELD

The disclosure relates to a plug connector housing with integrated strain relief and shield connection.

BACKGROUND

Plug connector housings with integrated strain relief and shield connection are used in particular in cleanroom environments. In environments of this type, convenient assembly of plug connectors with plug connector housings of this type is especially important. Good media tightness, as is often required in other applications, is not a priority here.

Very special protective conditions apply in so-called cleanrooms. For example, semiconductors are manufactured in such rooms. The concentration of germs and air particles in rooms of this type must be kept extremely low. Therefore, people working in these rooms also wear special protective clothing, which is disclosed for example in WO 1999/006136 A1.

Production machines, which are connected to one another via plug connectors, are located in the cleanrooms. The production machines are supplied with control signals and/or an operating voltage via further plug connectors, where applicable. Assembling the plug connectors while wearing protective clothing suitable for the cleanroom is particularly difficult and often time-consuming. This often results in time delays in the production process.

SUMMARY

The object of the invention consists in proposing a plug connector housing which enables simple assembly of a plug connector.

The object is achieved by the subject matter of the independent claim.

Advantageous configurations of the invention are described in the dependent claims.

The improved plug connector housing is conceived in particular for the use of so-called heavy-duty plug connectors (also known as industrial plug connectors). Such a plug connector is disclosed by way of example in WO 2017/174069 A1 which is hereby incorporated by reference. Industrial plug connectors are generally equipped with a metallic housing and are often used in harsh environments and in particular for transmitting high currents. A plug connector equipped with a plug connector housing according to the invention is intended to be usable in particular in cleanroom environments.

The plug connector housing has a cable connection element. The cables connected to the plug connector can be fastened on the cable connection element. The cable connection element is configured for fastening at least two cables, at least one first cable and at least one second cable, for shield connection and/or strain relief. In this regard, the terms strain relief and/or shield connection could also be assigned to the cable connection element.

The cable connection element has different fastening planes for the at least one first cable and the at least one second cable. If the plug side of the plug connector housing is regarded as the bottom plane, one fastening plane is located above the other fastening plane. The two fastening planes are at different distances from the plug face of the plug connector. The two fastening sides are arranged offset from one another in the plug-in direction.

A so-called cable outlet is located on a plug connector housing on the cable connection side. A cable connected to the plug connector can be guided through the cable outlet and strain relieved and also sealed in a media-tight manner via a so-called cable gland. Gaining access into the plug connector housing via the cable outlet is impossible. Preferably, the plug connector housing is designed to be open on the cable connection side. In this case, "open" means that direct access into the plug connector housing is possible. A user is able to reach into the housing without structural impediments and carry out assembly work. In the plug connector housing, the entire housing cover is omitted on the connection side, together with the cable outlet. Part of the side walls, in particular the narrow sides, can also be omitted.

The cable connection element preferably projects through the open connection side of the plug connector housing. Part of the cable connection element is located within the plug connector housing and part of the cable connection element is arranged outside the plug connector housing. The cable connection element is preferably made from a flat material having an S-shaped base area and fastening faces integrally formed thereon and protruding perpendicularly therefrom. The cable connection element is then ideally produced in a punching and bending procedure. The cable connection element can thus be produced particularly economically.

The two fastening faces of the cable connection element are advantageously arranged on different fastening planes. As seen in the plug-in direction, the fastening faces are arranged offset from one another and are parallel to one another. As seen transversely to the plug-in direction, the fastening faces are at a spacing from one another. As a result of this geometry, it is possible, with the existing installation space, to fasten as many cables to be connected as possible on the cable connection element whilst still having sufficient space to fix the cables in place manually.

The at least first cable and the at least second cable can preferably be arranged and fixed in place opposite one another. The first cable is then fixed on the first fastening face and the second cable is fixed on the second fastening face of the cable connection element. As a result of fixing the first and second cable on the cable connection element in an arrangement opposite one another and above one another, a particularly space-saving fixing of the cables on the plug connector housing is possible. Moreover, the individual cables can be easily accessed during assembly. The assembly of a plug connector is thus simplified.

It is advantageous if the cable connection element is made from an electrically conductive material. In this case, the cable connection element can be used for the shield connection of the cable to be connected, in particular when the plug connector housing is also made from an electrically conductive material.

In an advantageous variant, at least one clamp is provided on the fastening faces of the cable connection element in each case, by means of which clamp the cables to be connected can be fixed on the cable connection element. The clamps can be placed over the shielding braid of a cable to be connected, for example. However, the clamp can also lie on the soft cable sheath of the cable to be connected and press this slightly so that particularly good strain relief is ensured. On the whole, variable and simple fixing of the cable on the cable connection element is ensured by the clamp.

The plug connector housing has a rectangular cross-section having two opposing narrow sides and two opposing wide sides. The wide sides form the side faces of the plug connector housing. Advantageously, one fastening face of the cable connection element can be fixed on one side face and the other fastening face of the cable connection element can fixed on the other side face of the plug connector housing. The fixing procedure is preferably realized by a screw connection.

A fastening face is preferably fixed on the side face of the plug connector housing via at least one web. This refers to the fastening face which projects out of the plug connector housing. The web is made from an electrically conductive material in order to ensure the electrically conductive connection between the plug connector housing and the cable connection element.

The disclosure furthermore relates to a system comprising a plug connector housing and an attachment housing. The plug connector and the attachment housing refer to different components which are accordingly also used in different ways. A cable or a plurality of cables is or are connected to a plug connector in order to supply a device or a machine with control signals and/or an operating voltage. An attachment housing is generally fastened on a wall of a machine or the like and can e.g. be seen in DE 10 2015 106 963 A1, which is hereby incorporated by reference. An attachment housing has a substantially rectangular cross-section and is designed to be open on both sides. One side, the device connection side, faces the device or the machine. The other side, the plug connector connection side, is configured for receiving a plug connector. The open side of the plug connector is not suitable for connection to a device or a machine.

BRIEF DESCRIPTION OF THE DRAWINGS

An exemplary embodiment is illustrated in the drawings and will be explained in more detail below.

DETAILED DESCRIPTION

The figures contain partially simplified, schematic illustrations. Identical reference signs are sometimes used for elements which are similar but possibly not identical. Varying views of similar elements could be drawn to different scales.

Figure 1:
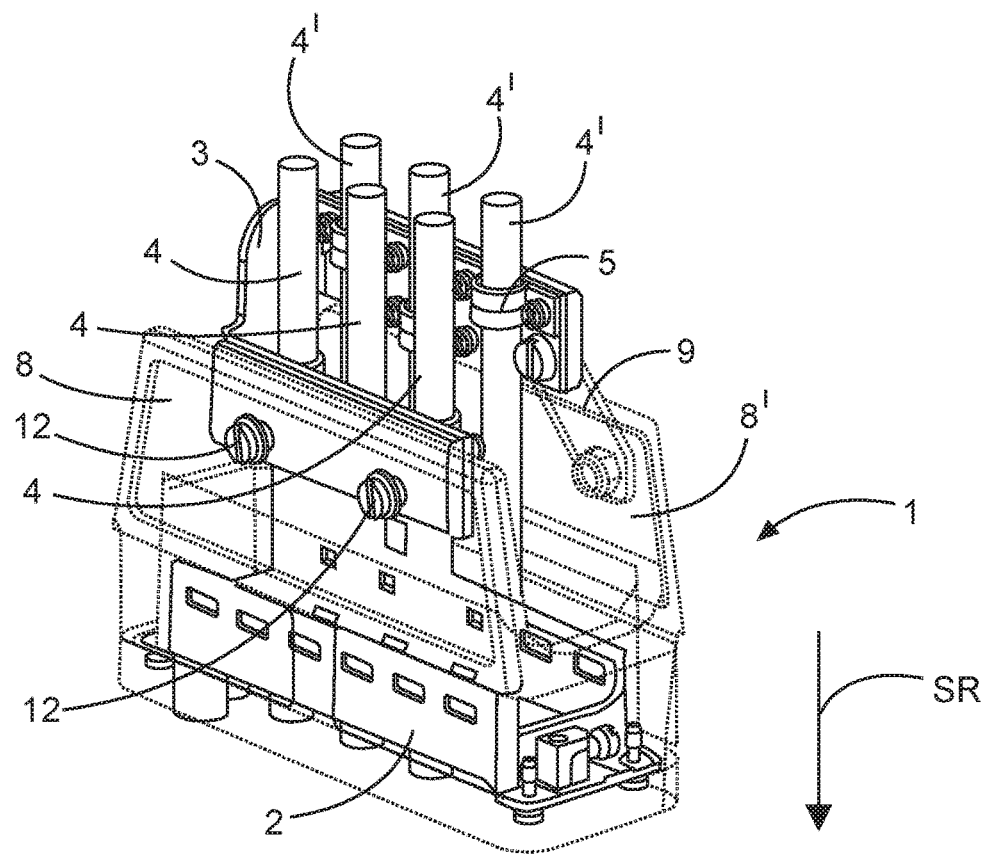
FIG. 1 is a perspective illustration of a transparent plug connector housing with a cable connection element and cables fixed thereon.

FIG. 1 shows a plug connector housing 1. For illustrative reasons, the plug connector housing is illustrated transparently. In reality, the exemplary embodiment of the plug connector housing 1 shown here is produced in a die casting procedure or injection molding procedure and is opaque in design.

A holding frame 2 for plug connector modules (not shown for illustrative reasons) is arranged in the plug connector housing 1. Such a holding frame for holding plug connector modules and for installation in plug connector housings or for screwing to wall faces is known from printed document EP 0 860 906 B1 which is hereby incorporated by reference.

In this case, the plug connector modules are inserted into the holding frame. Holding means are provided on the plug connector modules, which holding means cooperate with windows provided on opposing side parts of the holding frame, wherein the windows consist in cutouts which are formed as openings in the side parts of the holding frame, which openings are closed on all sides. The holding frame 2 is not a constituent part of the plug connector housing.

Figure 3:
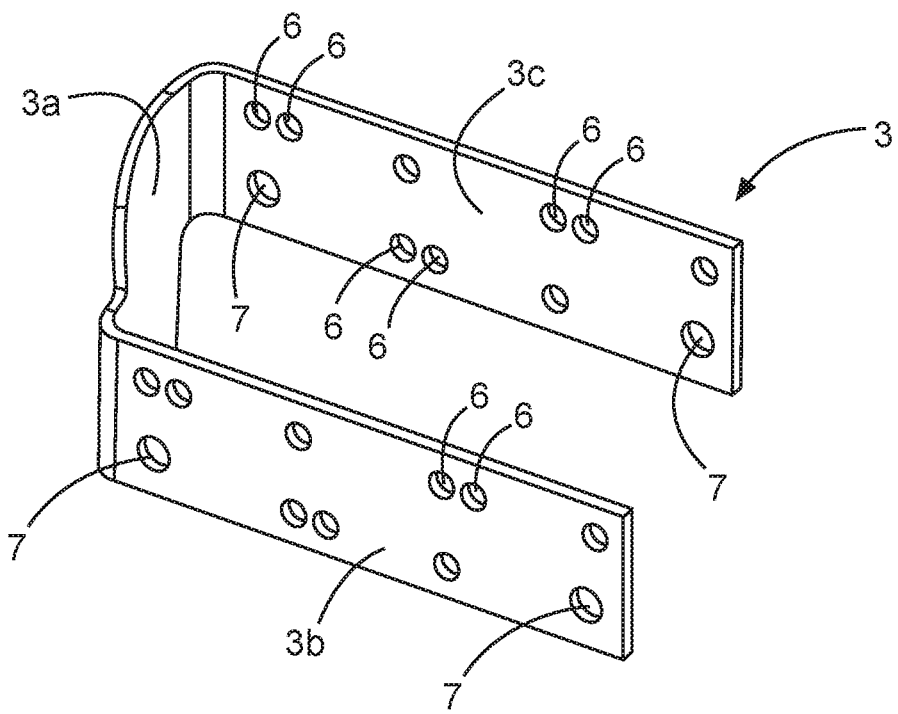
FIG. 3 is a perspective illustration of the cable connection element.

The plug connector housing 1 has a cable connection element 3. It can be seen in FIG. 3 that the cable connection element 3 is formed from a flat material having an S-shaped base area 3a and two fastening faces 3b, 3c integrally formed thereon and protruding perpendicularly therefrom. A screw-on plate 10 is fastened on the fastening faces 3b, 3c in each case with the aid of a screw 11. Threaded bores are also incorporated in the screw-on plate 10, by means of which clamps 5 are fixed on the cable connection element 3 via a screw connection. The screw-on plates 10 are made from an electrically conductive material.

Figure 2:
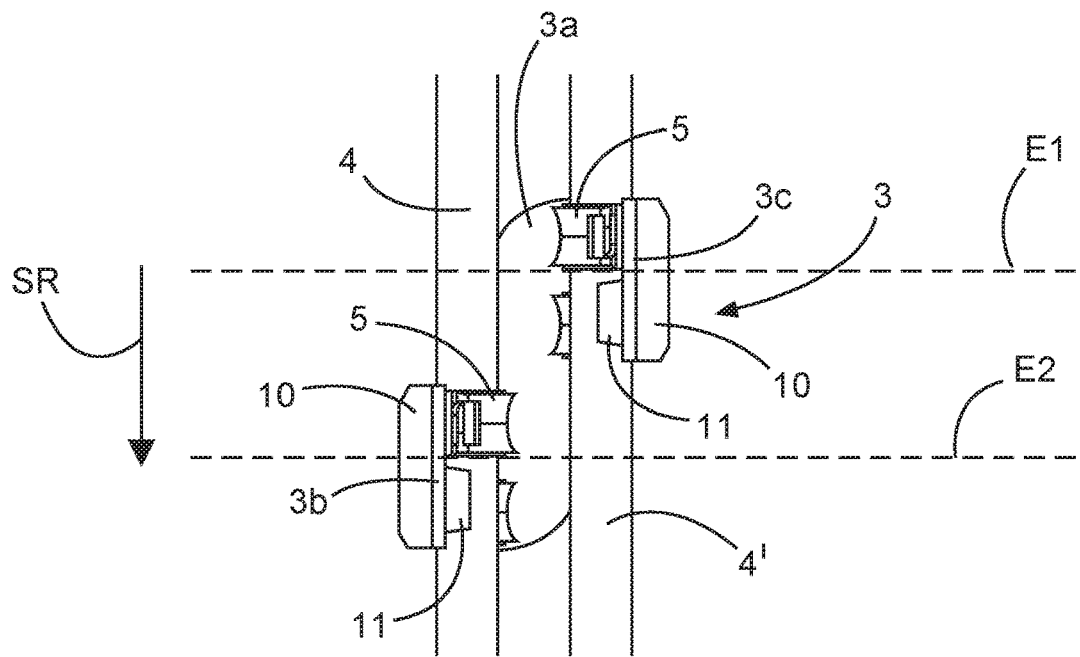
FIG. 2 is a side view of a cable connection element with a connected first and second cable.

It can be seen in FIG. 2 that at least one first cable 4 and at least one second cable 4' is fastened on the cable connection element 3. The cables 4, 4' are fixed on the cable connection element 3 via a clamp 5. The clamp 5 is fastened on the cable connection element 3 via a screw connection. To this end, openings 6, which are flush with the threaded bores of the screw-on plate 10, are provided on the cable connection element 3. Strain relief is realized by fixing the cables 4, 4' on the cable connection element 3.

The plug connector housing 1 has a rectangular cross-section and has two narrow sides and two wide sides. The wide sides are also referred to as side faces 8. The base body of the plug connector housing 1 is designed in one piece. The plug connector housing 1 is configured to be open on the plug side. This is common to the plug connector housing 1 and the known plug connector housings since an interface to an attachment housing or a mating plug connector must be provided here. The plug connector housing 1 is likewise designed to be open on the cable connection side. Open means that a housing cover with a cable output, such as in the known plug connector housings, is not provided here. As a result of the open design of the plug connector housing 1, access to the interior of the plug connector housing 1 is possible. The assembly of a plug connector with such a plug connector housing 1 is thus simplified.

Figure 4:
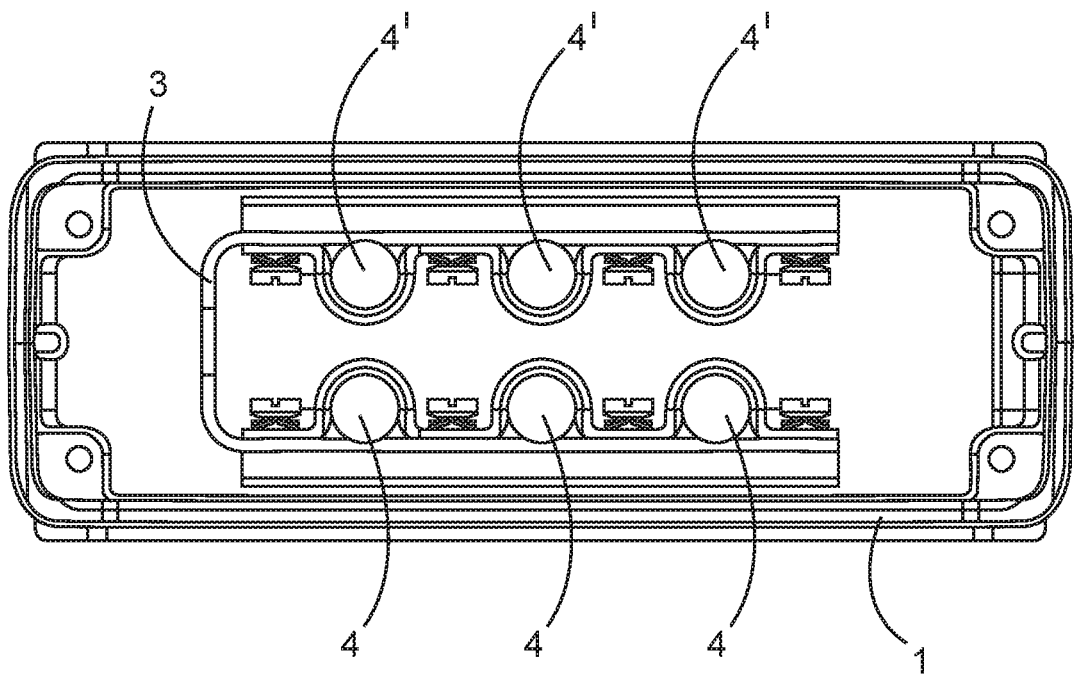
FIG. 4 is a plan view of a plug connector housing with a cable connection element and cables fixed thereon.

The cable connection element 3 is produced from a flat material in a punching and bending procedure. The cable connection element 3 has a U-shaped cross-section, as revealed in FIG. 4. The cable connection element 3 is made from an electrically conductive material and, in addition to the strain relief, can also be used for the shield connection of the connected cables 4, 4'. To this end, the clamp 5 is placed over the shielding braid (not shown) of the individual cables 4, 4' and screwed tightly on the cable connection element 3. Strain relief for the connected cable 4, 4' is also ensured in this case. Openings 7 are incorporated in the cable connection element 3, by means of which openings the cable connection element 3 can be fastened on the side faces 8, 8' of the plug connector housing 1. Threaded bores corresponding to the openings 7 of the first fastening face 3b of the cable connection element 3 are present on the side faces 8, 8' of the plug connector housing 1. The second fastening face 3c of the cable connection element 3 is fastened on the plug connector housing 1 via webs 9.

A plurality of cables 4, 4' can be connected to the cable connection element 3 of the plug connector housing 1. By way of example, 6 connected cables 4, 4' are shown in FIG. 1. However, the cable connection element 3 can be expanded as required and the number of cables 4, 4' can thus be expanded as required, of course depending on the installation area or depending on space. Owing to the S shape of the base area 3a, the first side face 3b and the second side face 3c are located on different planes in the installed state. The cable connection element 3 has different fastening planes E1, E2 for the at least first cable 4 or for the at least first cable 4 and for the at least second cable or the at least second cable 4'. In the language of the present invention, the cables fastened on the first side face 3b are referred to as first cables 4 and the cables fastened on the second side face are referred to as second cables 4'. A plug connector with a plug connector housing 1 according to the invention can have a plurality of first cables 4 and a plurality of second cables 4'.

The plug-in direction SR of the plug connector housing 1 or a plug connector with such a plug connector housing is shown as an arrow in FIGS. 1 and 2. It can be seen that the cable connection element 3 has two mutually opposing fastening planes E1, E2 for the cables 4, 4' to be connected, which fastening planes are arranged offset from one another in the plug-in direction. The first cables 4 lie on the fastening plane E2 and the second cables 4' are located on the fastening plane E1. The first cables 4 and the second cables 4' are aligned parallel to one another. As a result of fastening the cables 4, 4' on different planes, the parallel alignment of the first cables 4 with respect to the second cables 4' and, where applicable, also the open design of the plug connector housing 1, a plug connector can be assembled easily, even if the person responsible for this is wearing a cleanroom suit with the associated gloves.

During the assembly of a plug connector with a plug connector housing 1, the cables 4, 4' located on the plug connector modules or on a contact insert are connected to the cable connection element 3. This entire system (plug connector modules or contact insert and cables) can then be pushed into the plug connector housing 1. The cable connection element 3 is subsequently fastened on the plug connector housing 1 via the screws 12. To this end, the plug connector housing 1 has corresponding fastening openings. Whether the plug connector housing 1 is an open or a closed model is of secondary importance for this.

Even though the figures show varying aspects or features of the invention in combination in each case, it is clear to the person skilled in the art that—unless indicated otherwise—the combinations illustrated and discussed are not the only options. In particular, mutually corresponding units or feature complexes from different exemplary embodiments can be exchanged with one another.

LIST OF REFERENCE SIGNS

1 Plug connector housing
2 Holding frame
3 Cable connection element
4 Cable; first cable 4,
4' Second cable
5 Clamp
6 Openings
7 Openings
8 Side face
9 Web
10 Screw-on plate
11 Screw
12 Screw
E1, E2 Plane

What is claimed is:
1. A plug connector, comprising:
a housing;
a cable connection element on which cables can be fastened for shield connection and/or strain relief, wherein the cable connection element includes
a first fastening face to which a first cable is fastened at a first axial distance from a face of the plug connector and
a second fastening face to which a second cable is fastened at a second axial distance from the face of the plug connector, the second axial distance being greater than the first axial distance,
the first fastening face and the second fastening face extending perpendicular from opposite ends of a generally S-shaped base; and
a holding frame for plug connector modules arranged at the face of the plug connector within the housing.
2. The plug connector housing as claimed in claim 1, wherein the first cable and the second cable are arranged opposite one another.
3. The plug connector housing as claimed in claim 1, wherein a plurality of first cables are fastened to the first fastening face and a plurality of second cables are fastened to the second fastening face and
wherein the plurality of first cables are arranged opposite the plurality of second cables.
4. The plug connector housing as claimed in claim 1, wherein the cable connection element is formed from a flat material having an S-shaped base area and
wherein the first fastening face and the second fastening face are integrally formed thereon and protruding perpendicularly therefrom in the same direction.
5. The plug connector housing as claimed in claim 4, wherein a screw-on plate is fastened on each of the two fastening faces.
6. The plug connector housing as claimed in claim 5, wherein at least one clamp is screwed on each of the two fastening faces, by which clamp the at least two cables to be connected are fixed on the cable connection element.
7. The plug connector housing as claimed in claim 5, wherein the plug connector housing has at least two opposing side faces and
wherein the first fastening faces of the cable connection element is fixed on a first of the two opposing side faces and the second fastening face of the cable connection element is fixed on a second of the two opposing side faces.
8. The plug connector housing as claimed in claim 7, wherein the second fastening face is fixed on the second of the two opposing side faces of the plug connector housing via at least one web.
9. The plug connector housing as claimed in claim 4, wherein the two fastening faces are arranged at two mutually opposing fastening planes.
10. The plug connector housing as claimed in claim 1, wherein the cable connection element is made from an electrically conductive material.

* * * * *